United States Patent
Tanaka et al.

(10) Patent No.: US 9,774,220 B2
(45) Date of Patent: Sep. 26, 2017

(54) PERMANENT MAGNET AND MOTOR

(71) Applicant: TDK CORPORATION, Tokyo (JP)

(72) Inventors: Daisuke Tanaka, Tokyo (JP); Yasushi Enokido, Tokyo (JP)

(73) Assignee: TDK CORPORATION, Tokyo (JP)

( * ) Notice: Subject to any disclaimer, the term of this patent is extended or adjusted under 35 U.S.C. 154(b) by 378 days.

(21) Appl. No.: 14/678,288

(22) Filed: Apr. 3, 2015

(65) Prior Publication Data

US 2015/0294770 A1    Oct. 15, 2015

(30) Foreign Application Priority Data

Apr. 15, 2014 (JP) ................. 2014-083304

(51) Int. Cl.

| | |
|---|---|
| H02K 21/00 | (2006.01) |
| H02K 1/02 | (2006.01) |
| C22C 28/00 | (2006.01) |
| C22C 30/02 | (2006.01) |
| H01F 1/057 | (2006.01) |
| C22C 33/02 | (2006.01) |
| C22C 38/00 | (2006.01) |

(52) U.S. Cl.
CPC ............... *H02K 1/02* (2013.01); *C22C 28/00* (2013.01); *C22C 30/02* (2013.01); *C22C 33/0278* (2013.01); *C22C 38/002* (2013.01); *C22C 38/005* (2013.01); *H01F 1/0577* (2013.01); *C22C 2202/02* (2013.01)

(58) Field of Classification Search
CPC ........ H01F 1/0578; H01F 1/015; H01F 1/053; H02K 1/02

USPC ..... 310/43–44; 148/101, 122, 300, 301, 302
See application file for complete search history.

(56) References Cited

U.S. PATENT DOCUMENTS

| | | | | |
|---|---|---|---|---|
| 7,842,140 B2 * | 11/2010 | Kanekiyo | ............ | B22D 11/0611 148/101 |
| 7,988,795 B2 * | 8/2011 | Hirota | .................. | H01F 1/0577 148/101 |
| 8,038,807 B2 | 10/2011 | Morimoto et al. | | |
| 8,425,695 B2 * | 4/2013 | Hayakawa | ............ | H01F 1/0577 148/101 |
| 9,548,148 B2 * | 1/2017 | Kunieda | ................. | C22C 19/07 |

(Continued)

FOREIGN PATENT DOCUMENTS

| | | |
|---|---|---|
| CN | 102220538 A | 10/2011 |
| JP | 4450239 B2 | 4/2010 |
| JP | 4831074 B2 | 12/2011 |

*Primary Examiner* — Thanh Lam
(74) *Attorney, Agent, or Firm* — Oliff PLC

(57) ABSTRACT

The present invention provides an R-T-B based permanent magnet, comprising: a main phase which is composed of the structure of $R_2T_{14}B$ (R is at least one element selected from Y, La, Ce, Pr, Nd, Sm, Eu and Gd, and T is one or more transition metal elements having Fe or a combination of Fe and Co as necessary); and a grain boundary phase which is composed of $Ce_xM_{1-x}$ (M is at least one element selected from Mg, Al, Si, Ti, Cr, Mn, Fe, Co, Ni, Cu, Zn, Ga, Y, Zr, Nb, Mo, Ag, In, Sn, La, Pr, Nd, Sm, Eu, Gd, Hf, Ta, W and Bi, and x is within the range of $0.20 \leq x \leq 0.55$), and the cross-sectional ratio Atre of the grain boundary phase to the whole magnet structure is within the range of $0.03 < Atre < 0.07$.

4 Claims, 1 Drawing Sheet

(56) References Cited

U.S. PATENT DOCUMENTS

2004/0166013  A1*  8/2004  Nishizawa ............ H01F 1/0557
                                                        419/12
2004/0177899  A1*  9/2004  Nishizawa ............ C22C 1/0441
                                                        148/302
2008/0245442  A1   10/2008  Nakamura et al.

* cited by examiner

PERMANENT MAGNET AND MOTOR

The present invention relates to a permanent magnet with a high coercivity, and a motor using thereof.

BACKGROUND

Up to now, an alnico magnet, a ferritic magnet, a Sm—Co magnet, an Nd—Fe—B magnet ant the like are well known as a permanent magnet. The suitable magnets are respectively used as key parts in various motors such as VCM and spindle motor; and other various electric equipments such as measuring equipment, loudspeaker and MRI for medical treatment according to their specifications. Among these magnets, the rare earth based magnet such as the Sm—Co magnet, Nd—Fe—B magnet and the like contain rare earth element(s) and a high amount of Fe or Co. Fe and Co contribute to the increase of saturation flux density (Br). And the rare earth elements contribute to the increase of coercivity (HcJ) and thus good magnetic properties can be realized because the rare earth elements bring out a greatly high magnetic anisotropy which is derived from the movement of 4f electron in the crystal field.

Recently, demands for miniaturization and energy saving of various electric equipments are increasing, and higher maximum energy product [(BH)max] and higher coercivity are required compared to the permanent magnet used as the materials for key parts of these equipments. Therefore, the rare earth based magnet with high performance, especially R-T-B based magnet is widely used in various fields. And, many studies are carried out to get higher coercivity.

As for the techniques to improve the coercivity of the R-T-B based magnet, for example, these is a technique in which heavy rare earth elements such as Dy or Tb are added. A method has been provided in which Dy is deposited at the outside of the sintered body and then Dy is diffused to the internal grain boundary (Patent Document 1). Besides, a method in which fluoride of Dy and the like is coated to the surface of the sintered body has been proposed (Patent Document 2).

PATENT DOCUMENT

Patent Document 1: JP 4831074B
Patent Document 2: JP 4450239B

However, the heavy rare earth elements such as Dy or Tb or the like is short of resources and unevenly distributed, and thus its price and supply are unstable. Hence, an R-T-B based sintered magnet is strongly desired so far with both maintaining high magnetic properties and reducing the usage amount of the heavy rare earth element.

SUMMARY

The present invention is made to solve the technical problem mentioned above. The present invention aims to provide an R-T-B based permanent magnet without the heavy rare earth element and having a higher coercivity than current products.

In order to solve the above technical problem and achieve the aim of the present invention, the permanent magnet of the present invention is characterized in that it comprises a main phase which is composed of the structure represented by $R_2T_{14}B$ (R is at least one element selected from the group consisting of Y, La, Ce, Pr, Nd, Sm, Eu and Gd, and T is one or more transition metal elements having Fe or a combination of Fe and Co as necessary); and a grain boundary phase which is composed of $Ce_xM_{1-x}$ (M is at least one element selected from the group consisting of Mg, Al, Si, Ti, Cr, Mn, Fe, Co, Ni, Cu, Zn, Ga, Y, Zr, Nb, Mo, Ag, In, Sn, La, Pr, Nd, Sm, Eu, Gd, Hf, Ta, W and Bi, and x is within the range of $0.20 \leq x \leq 0.55$), and the cross-sectional area ratio Atre of the grain boundary phase to the whole magnet structure is within the range of $0.03 < Atre < 0.07$.

The present inventors have found out that the coercivity can be improved even if the heavy rare earth element is not added in the case that Ce, which is cheaper than the heavy rare earth elements and rich in resources, is contained with a specified amount in the grain boundary phase of the R-T-B based permanent magnet.

The present inventors consider that the reason is that since the grain boundary phase containing Ce especially with a low melting point among the rare earth elements shows high compatibility with the main phase, and magnetic separation is improved by means that the main phase grains are covered by the specified thermal treatment.

In addition, the residual magnetic flux density will not be decreased with such composition ratio, and the effect of the coercivity can be resulted from the grain boundary phase containing Ce.

In the permanent magnet of the present invention, the frequency at the cross-section Fbg is preferably $0.5 \leq Fgb$, wherein in the cross-section, the dihedral angle formed by grains of the main phase at the triple junction is 90° or less.

Upon such a structure, the compatibility of the grain boundary phase with the main phase is sufficiently high, and the magnetic separation can be improved due to the grain boundary phase, and thus a sufficiently high coercivity can be shown.

Further, the present invention provides a motor comprising the above permanent magnet. The motor of the present invention can have a high output and a high efficiency as it comprises the permanent magnet with the above properties.

According to the present invention, it can provide an R-T-B based permanent magnet and a motor having thereof, wherein the R-T-B based permanent magnet has a sufficiently high coercivity, and is obtained from the raw material which is rich in resources and cheap by forming a grain boundary phase with a large amount of Ce without using the heavy rare earth elements.

DETAILED DESCRIPTION OF EMBODIMENTS

Hereinafter, the embodiments which are used to carry out the present invention will be described in detail with reference to the drawings according to the different situations. Further, the present invention is not limited to the following embodiments and examples. In addition, the constituent elements in the following embodiments and examples include those easily thought of by those skilled in the art, those substantially the same and those having the equivalent scopes. Besides, the constituent elements disclosed in the following embodiments and examples can be appropriately combined or can be properly selected.

Firstly, the preferable permanent magnet according to the present embodiment is described. The R-T-B based permanent magnet according to the present embodiment contains 12 to 18 at % of rare earth element(s) (R). If the amount of R is less than 12 at %, the formation of $R_2T_{14}B$ phase which becomes the main phase in the R-T-B based sintered magnet is insufficient and α-Fe or the like which has soft magnetic property is precipitated, which causes a significant decrease of the coercivity. On the other hand, if the amount of R is more than 18 at %, the volume ratio of the $R_2T_{14}B$ phase as the main phase reduces, and the residual magnetic flux density reduces. Moreover, R is reacted with oxygen and thus the amount of the contained oxygen increases. Accompanied with such situation, the amount of R-rich phase which is effective to production of the coercivity reduces, resulting in the decrease of the coercivity. R contains element(s) selected from the group consisting of Y, La, Pr, Nd, Sm, Eu and Gd, and R contains Ce as necessary. Here, 0.5 to 5 at % of Ce is contained relative to the permanent magnet. In the case that the amount of Ce is less than 0.5 at %, the grain boundary phase with Ce almost can not be formed which is effective to enhance the coercivity. In the case that the amount of Ce is more than 5 at %, the amount of Ce is too much in the grain boundary phase or its solid solution is developed towards the main phase, and thus the residual magnetic flux density decreases. R can be contained as the other component which is the impurity derived from the raw materials or mixed during the production.

The permanent magnet according to the present embodiment contains 73 to 83 at % of one or more transition metal elements (T) having Fe or a combination of Fe and Co as necessary. If the amount of T is less than 73 at %, the residual magnetic flux density tends to reduce. Besides, if the amount of T is more than 83 at %, the high coercivity can not be obtained. The amount of Co is preferably 0 at % or more and 10 at % or less relative to the amount of T. With the increase of the amount of Co, the Curie temperature can be increased, and the decrease of the coercivity relative to the increase of temperature can be inhibited to a low level. Further, the corrosion resistance of the rare earth based permanent magnet can be improved by increasing the amount of Co.

The R-T-B based permanent magnet according to the present embodiment contains 5 to 8 at % of B. When the content of B is less than 5 at %, high coercivity can not be achieved. On the other hand, if the content of B is more than 8 at %, the residual magnetic flux density tends to decrease. Hence, the upper limit of B is set as 8 at %. The part of B can be replaced by C, and the replacement amount of C is preferable 10 atomic % or less relative to B.

The R-T-B based permanent magnet according to the present embodiment comprises the main phase which is composed of $R_2T_{14}B$; and the grain boundary phase $Ce_xM_{1-x}$ which is composed of Ce and element M other than Ce. The alloy with a lower melting point than the main phase can be fanned by M together with Ce. M is at least one element selected from the group consisting of Mg, Al, Si, Ti, Cr, Mn, Fe, Co, Ni, Cu, Zn, Ga, Y, Zr, Nb, Mo, Ag, In, Sn, La, Pr, Nd, Sm, Eu, Gd, Hf, Ta, W and Bi. From the viewpoint of production, M is preferably selected from the group consisting of Al, Fe and Cu. Further, from the viewpoint of corrosion resistance, M preferably contains Co. The amount of Ce (x) occupied in the grain boundary phase is within the range of $0.20 \le x \le 0.55$. Within this range, Ce helps to improve the compatibility of the grain boundary phase and easily covers the main phase grains. As a result, magnetic separation of the main phase is improved and the coercivity is increased. On the other hand, if x is less 0.20, the improvement effect of the compatibility of the grain boundary phase produced by Ce can not be realized, and a soft phase is formed based on the species of selected M, and thus the coercivity reduces. X is more preferably within the range of $0.33 \le x \le 0.55$.

In the permanent magnet according to the present embodiment, the cross-sectional ratio of the all grain boundary phase to the whole magnet structure (Atre) is within the range of $0.04 < Atre < 0.07$. Here, the constitution of the so-called whole magnet structure means main phase, subphase other than the main phase, and holes. Since the percentage of coverage of the main phase grains due to grain boundary phase is increased by the increase of the Atre, the coercivity is enhanced. However, if the Atre is more than 0.07, the decrease of the residual magnetic flux density becomes significant because of the decrease of the main phase grains.

In the permanent magnet according to the present embodiment, the frequency Fbg at the cross-section is preferably $0.5 \le Fgb$, where the dihedral angle formed by the main phase grains at the triple junction is 90° or less. By increasing Fgb, the compatibility of the grain boundary phase with the main phase can be sufficiently improved. And thus, the effect of magnetic separation caused by the grain boundary phase is enhanced and sufficiently high coercivity is shown.

In the permanent magnet according to the present embodiment, the amount of impurity elements such as oxygen, nitrogen, carbon, and the like is preferably reduced as much as possible. Especially, oxygen will make the magnetic properties deteriorate, and thus its amount is preferably set to be 5000 ppm or less, more preferably 3000 ppm or less. If the amount of oxygen is too much, rare earth oxide phase as the non-magnetic component become large, leading to the decrease of the magnetic properties.

As for the permanent magnet according to the present embodiment, a protective film can be formed on the surface of the magnet body. The protective film according to the present embodiment is not particularly limited, but the protective film formed by electrolytic plating is particularly preferable. Any one of Ni, Ni—P, Cu, Zn, Cr, Sn and Al can be used as the material for electrolytic plating. Ce in the grain boundary phase of the present embodiment can form $Ce_3Ni$ with Ni and shows a high compatibility with Ni, so Ni is the most preferably as the coating film. The protective film formed by electrolytic plating is the typical one according to the present embodiment, but the protective film formed by the other method also can be used. As the protective film formed by the other method, any one of resin coating or chemical conversion treatment such as electroless plating and chromate treatment can be applied or the combination thereof can be employed. The thickness of the protective film can be adjusted according to the size of the rare earth based sintered magnet body, the level of the required corrosion resistance and the like. It can be properly determined at the range of 1 to 100 μm. The thickness of the protective film is preferable 1 to 50 μm.

Hereinafter, the preferable preparation method of the permanent magnet according to the present embodiment will be described. In the preparation of the R-T-B based permanent magnet in the present embodiment, firstly, the alloy raw material(s) will be prepared with which an R-T-B based magnet having the desired composition can be obtained. The alloy raw material(s) can be prepared by the strip casting method or other well known melting methods under vacuum or at an inert atmosphere, preferably at Ar atmosphere. In the strip casting method, the molten metal obtained by melting the starting metal(s) at a non-oxidative atmosphere such as Ar atmosphere is sprayed to the surface of the rotating roll. The molten metal quenched on the roll will be solidified into a thin plate or a sheet (a scale-like shape). The peripheral velocity of the roll is preferable within the range of 0.3 to 15 m/s, and more preferable within the range of 0.5 to 12 m/s, When the peripheral velocity is extremely low, α-Fe or unevenness of alloy will be easily caused. Besides, in the case of the peripheral velocity being extremely high, the crystal grains will be small and equiaxed chill crystal will be generated, and thus good magnetic properties can not be obtained. The quenched and solidified alloy is formed as a sheet having a thickness of 0.1 to 1 mm, and the quenched and solidified alloy has a uniform structure with a grain diameter of 1 to 50 μm. The method for preparing the alloy raw material is not limited to the strip casting method, and the alloy raw material can also be obtained by melting methods such as the high frequency induction melting method. Further, in order to prevent from segregation after the melting process, for example, the molten metal can be poured on a water cooled copper plate so as to be solidified. Also, the alloy obtained by the reduction diffusion method also can be used as the alloy raw material.

In the case of obtaining the R-T-B based permanent magnet in the present invention, as for the alloy raw materials, a two-alloy method is basically applied in which the sintered magnet is prepared by a alloy (the alloy for the main phase) having the $R_2T_{14}B$ crystals as the main body as well as a alloy (the alloy for the grain boundary phase) which becomes liquid phase during sintering and forms the grain boundary phase after sintering. Compared to single-alloy method in which the sintered magnet is produced by one alloy, the grain boundary phase is easily formed by the two-alloy method. The two-alloy method is applied to easily realize the grain boundary phase of $Ce_xM_{1-x}$ of the present invention by adjusting the alloy for the boundary phase with Ce and M as the main components.

The alloy raw material is subjected to a pulverization process. The alloy for the main phase and the alloy for the grain boundary phase are pulverized respectively or together. The pulverization process includes a coarse pulverization step and a fine pulverization step. Firstly, the alloy raw material(s) is pulverized until a particle diameter of approximately several hundred μm. The coarse pulverization is preferably performed by using a coarse pulverizer such as a stamp mill, a jaw crusher, a Brown mill and the like in the atmosphere of an inert gas. Before coarse pulverization, it is effective that hydrogen is adsorbed in the raw alloy, and then the hydrogen is released in order to perform pulverization. The purpose of hydrogen-releasing treatment is to reduce hydrogen to be the impurities in the rare earth-based sintered magnet. The maintained heating temperature to hydrogen adsorbed is set to be 200° C. or more, preferably 350° C. or more. The holding time depends on the relation with maintained temperature, the thickness of the raw alloy and etc., and it is set to be at least 30 min or more, preferably 1 hour or more. The hydrogen-releasing treatment is preformed in vacuum or in the airflow of Ar. Further, hydrogen-adsorbing treatment and hydrogen-releasing treatment is not necessary treatment. The hydrogen pulverization can be defined as the coarse pulverization to omit a mechanical coarse pulverization.

After the coarse pulverization, the fine pulverization is performed. During the fine pulverization, as dry pulverization, a jet mill is mainly used to pulverize the coarse pulverized powder having a particle diameter of approximately several hundred μm to be a powder with a particle diameter of 1 to 6 μm, preferably 3 to 5 μm. The pulverization is carried out through the jet mill, in which the jet mill discharges inert gas from a narrow nozzle at high pressure and produces high speed airflow, and then the coarse pulverized powder is accelerated with the high speed airflow, causing a collision between coarse pulverized powders each other or a collision between coarse pulverized powders and a target or a container wall. He, $N_2$, Ar or the like can be selected as the inert gas for pulverization. In addition, a lubricant can be added in order to prevent powders from aggregating during the pulverization, improve the flowability, enhance the lubrication or the orientation during molding, and adjust the amount of C. The lubricant such as zinc stearate, calcium stearate, aluminum stearate, magnesium stearate, stearamide, oleamide, erucamide, methylenebis (stearic amide), ethylenebis(stearic amide), paraffin, naphthalene or the like can be selected to use. The additive amount of the lubricant is preferable 0.01 to 0.5 wt % relative to the coarse pulverized powder for pulverization.

The wet pulverization also can be applied in the fine pulverization. In the wet pulverization, a ball mill, wet attritor or the like can be used to pulverize the coarse pulverized powder having a particle diameter of approximately several hundred μm to be a fine pulverized powder with a particle diameter of 0.1 to 5 μm, preferably 2 to 4.5 μm. An appropriate dispersion medium is chosen in the wet pulverization to prepare slurry. The pulverization is performed without the powder of the magnet exposed to oxygen, so the fine powder with low oxygen concentration can be obtained. The dispersion medium such as isopropyl alcohol, ethanol, methanol, ethyl acetate, phosphate ester, pentane, hexane, benzene, toluene, xylene, acetone, methyl ethyl ketone or the like can be chosen to use. The concentration of the slurry can be 1 to 50 wt %, preferably 20 to 45 wt %.

The fine powder is subjected to mixing. In the mixing process, Nauta-mixer, planetary mixer or the like can be used. In the case that the alloy for the main phase and the alloy for the grain boundary phase are pulverized at the same time in the pulverization process, the mixing process can be omitted.

The fine powder is subjected to a molding process in a magnetic field. In the molding process in a magnetic field, the molding pressure may be set to be in a range of 0.3 to 3 ton/cm$^2$ (30 to 300 MPa). The molding pressure can be constant or eventually increased or eventually decreased from the start to the end of the molding, and also can be randomly changed. The lower the molding pressure is, the better the orientation is. If the molding pressure is much too low, the strength of the molded body will be insufficient, thereby leading to problems in the handling treatment. Thus, the molding pressure is considered to be set within the range mentioned above. The molded body obtained in the molding process in a magnetic field will usually have a final relative density of 40 to 60%.

The applied magnetic field can be made to be around 10 to 20 kOe (960 to 1600 kA/m). The applied magnetic field is not limited to be a static magnetic field. A pulsed magnetic field can also be used. Further, the static magnetic field and the pulsed magnetic field can be used in combination.

Subsequently, the molded body is sintered in a vacuum or an inert gas atmosphere. A sintering temperature is required to be adjusted considering many conditions, such as composition, pulverization method, a difference of average particle diameter and grain size distribution, and the like. The sintering process may be performed at a temperature of 1000 to 1200° C. for 30 minutes to 8 hours. If the sintering time is less than 30 minutes, densification will be insufficient. Additionally, if the molded body is sintered for 8 hours or more, bad influence on magnetic properties is brought out due to development of abnormal grain growth and diffusion of the component in the grain boundary phase towards the main phase grains. In order to prevent from the un-useful diffusion or grain growth, two-stage sintering method, SPS (spark plasma sintering method), microwave sintering method or the like can be used.

After the sintering process, the obtained sintered body is subjected to an aging treatment. The process is important for optimizing the grain boundary phase containing $Ce_xM_{1-x}$ and controlling the coercivity. When the aging treatment is divided into two stages, it will be effective to perform the process at 800° C. to 950° C. (high-temperature aging) and then 500° C. to 700° C. (low-temperature aging) respectively for a specified time. If the high-temperature aging is done after the sintering process, it is effective to increase the coercivity. Especially, it is effective when the two-alloy method is applied. In addition, the low-temperature aging is used to sharply increase the coercivity in most cases. Thus, if aging treatment is carried out with one stage, the aging process can be performed at low temperature.

The sintered body subjected to the above treatment is cut into the desired size and shape. The processing method of the surface of the sintered body is not particularly limited, and the mechanical processing can be carried out. As for the mechanical processing, for example, polishing treatment using a whetstone can be listed.

Further, the protective film can be formed on the surface of the sintered body if necessary. The formation of the protective film can be performed by the well known method according to the species of the protective film. For example, in the case of electrolytic plating, the conventional method i.e., defatting, water washing, etching (such as by nitric acid), water washing, film formation through electrolytic plating, water washing, and drying can be used. The defatting and chemical etching by acids can be applied to cleanse the surface of the sintered body. As a plating bath used in the electrolytic plating of Ni, Watt's bath without nickel chloride (nickel sulfate and boric acid can be contained as the main components), sulfamine acid bath, boron fluoride bath, nickel bromide or the like can be listed. However, in this case, as anodic dissolution becomes less, nickel ion is preferably supplemented into the bath. The nickel ion is preferably supplemented as the solution of nickel sulfate or nickel bromide.

Hereinafter, the motor according to the present embodiment will be described. FIG. 1 is a cross-section view showing the embodiment of the preferable motor according to the present invention. In the permanent magnet embedded motor 1 shown in FIG. 1, the rotor 3 is disposed inside the stator 2. In the iron core 4 inside the rotor 3, the permanent magnet 5 composed of a permanent magnet with a high residual magnetic flux density and a high coercivity is disposed. The permanent magnet according to the present embodiment is used as the permanent magnet 5 and thus a high coercivity can be sufficiently shown. Thus, the motor with a high output and a high efficiency can be obtained.

EXAMPLES

Hereinafter, the present invention will be described in detail based on examples and comparative examples. However, the present invention is not limited to the examples described below.

Comparative Example 1

The raw materials of Nd, Fe, FeB, Co, Cu and Al with the purity of 99.9% were weighted respectively, and thus a composition of the main phase alloy of Nd 11.8 at %-Fe 82.4 at %-B 5.8 at % and a composition of the grain boundary phase alloy of Nd 64 at %-Fe 23.7 at %-Co 10.3 at %-Cu 1.0 at %-Al 1.0 at % could be obtained. The raw alloy sheets were melt and casted by the strip casting method.

The obtained sheets of the main phase alloy and the grain boundary phase alloy were pulverized by means of hydrogen to obtain coarse pulverized powder. Oleamide was added of 0.1 wt % to the coarse pulverized powder as a lubricant. Then, the powders of the main phase alloy and the grain boundary phase alloy were mixed with the weight ratio of the main phase alloy to the grain boundary phase alloy being 9:1. The fine pulverization was performed under high pressure in the atmosphere of $N_2$ gas by using a jet mill to obtain a fine pulverized powder. The particle diameter of the obtained fine powder was measured by a particle size distribution meter. As a result, the vale of D50 was confirmed as 3.6 μm.

Subsequently, the produced fine pulverized powder was molded in a magnetic field of 15 kOe at a pressure of 140 MPa to obtain a molded body with the size of 20 mm×18 mm×13 mm. The direction of the magnetic field was vertical to pressing direction. The obtained molded body was fired at 1030° C. for 6 hours. Next, the aging treatment was performed at 850° C. for 1 hour and then at 600° C. for 1.5 hours to get a sintered body.

The residual magnetic flux density Br and the coercivity HcJ of the obtained sintered body were calculated based on the measurement results of demagnetization curve obtained by a B—H tracer. The results were shown in Table 1.

It was confirmed by the X-ray diffraction analysis that the major formation phase was tetragonal structure represented by $R_2T_{14}B$ in the obtained sintered body.

Moreover, the obtained sintered article was embedded into the epoxy resin, and then its cross-section was polished. Commercially available abrasive papers were used in the grinding process. Specifically, the grinding process was performed while abrasive papers with increasing grit sizes from low type to high type were used to grind. At last, a buff and a diamond abrasive grain were used in grinding. Here, the grinding was performed without providing water or the like in order to prevent the components in the grain boundary phase from corroding.

FE-SEM (field-emission scanning electron microscope) was used to observe the backscattered electron images of the cross-section of the sintered body after embedded into the resin and grinded. As for 100 triple junctions in the observation images, dihedral angles (See FIG. 2) of the main phase grains were measured by image analysis, and the ratio of the measurement numbers with dihedral angle being 90° or less to all the measurement numbers was set as Fgb. In addition, EDS (energy dispersive X-ray spectrometer) attached in FE-SEM was used. A threshold value was set based on the shade of color in the backscattered electron image so that the compositions of the constituent phases were classified. A Nd-rich grain boundary phase was confirmed besides the main phase. The ratio Atre of all the grain boundary phases in the cross-section was calculated by image analysis. The results were shown in Table 1.

Comparative Example 2

The alloy sheets were prepared and pulverized by the same method as that in Comparative Example 1 except that the composition of the grain boundary phase was Ce 10.1 at %-Nd 71.1 at %-Fe 6.5 at %-Co 10.3 at %-Cu 1.0 %-Al 1.0 at %. After the particle diameter of the obtained fine powder was measured by the particle size distribution meter, the vale of D50 was confirmed as 3.5 μm.

Next, the molded body was produced by the same method as that in Comparative Example 1. The molded body was subjected to a sintering process by a two-stage sintering method. The molded body was heated to 1100° C., then quenched to 1000° C., and then fired at 1000° C. for 4 hours, By using the two-stage sintering method, diffusion of Ce in grain boundary phase alloy towards the main phase grains could be inhibited and Ce was easily distributed in the grain boundary phase. Thereafter, an aging treatment was conducted at 850° C. for 1 hour and 600° C. for 1.5 hours to obtain a sintered body.

Then, Br and HcJ were calculated according to the measurement results obtained by the B—H tracer with the same method as that in Comparative Example 1. It was confirmed that the major formation phase in the obtained sintered body had the tetragonal structure of $R_2T_{14}B$. It was confirmed from the results of FE-SEM and EDS that the Nd-rich grain boundary phase was present besides the main phase, and the concentration x of Ce in the grain boundary phase was calculated. After that, Fgb and Atre were calculated. The results were shown in Table 1.

Example 1

The alloy sheets were prepared and pulverized by the same method as that in Comparative Example 1 except that the composition of the grain boundary phase was Ce 13.5 at %-Nd 25.5 at %-Fe 48.7 at %-Co 10.3 at %-Cu 1.0 at %-Al 1.0 at %. After the particle diameter of the obtained fine powder was measured by the particle size distribution meter, the vale of D50 was confirmed as 3.6 µm.

Next, the molded body was produced by the same method as that in Comparative Example 2. The sintering process and the aging treatment were carried out to obtain the sintered body.

Then, Br and HcJ were calculated according to the measurement results obtained by the B—H tracer with the same method as that in Comparative Example 1. It was confirmed that the major formation phase in the obtained sintered body had the tetragonal structure of $R_2T_{14}B$. It was confirmed from the results of FE-SEM and EDS that the Ce-rich grain boundary phase and the Nd-rich grain boundary phase were present besides the main phase. And the concentration x of Ce in the grain boundary phase was calculated. As Ce was highly concentrated in the Ce-rich grain boundary phase, x was represented with the concentration of Ce in the Ce-rich grain boundary phase in the present example. After that, Fgb and Atre were calculated. The results were shown in Table 1.

Example 2

The alloy sheets were prepared and pulverized by the same method as that in Comparative Example 1 except that the composition of the grain boundary phase was Ce 23.2 at %-Nd 27.7 at %-Fe 36.8 at %-Co 10.3 at %-Cu 1.0 at %-Al 1.0 at %. After the particle diameter of the obtained fine powder was measured by the particle size distribution meter, the vale of D50 was confirmed as 3.5 µm.

Next, the molded body was produced by the same method as that in Comparative Example 2. The sintering process and the aging treatment were carried out to obtain the sintered body.

Then, Br and HcJ were calculated according to the measurement results obtained by the B—H tracer with the same method as that in Comparative Example 1. It was confirmed that the major formation phase in the obtained sintered body had the tetragonal structure of $R_2T_{14}B$. It was confirmed from the results of FE-SEM and EDS that the Ce-rich grain boundary phase and the Nd-rich grain boundary phase were present besides the main phase. And, x, Fgb and Atre were calculated by the same method as that in Example 1. The results were shown in Table 1.

Example 3

The alloy sheets were prepared and pulverized by the same method as that in Comparative Example 1 except that the composition of the grain boundary phase was Ce 54.5 at %-Fe 33.2 at %-Co 10.3 at %-Cu 1.0 at %-Al 1.0 at %. After the particle diameter of the obtained fine powder was measured by the particle size distribution meter, the vale of D50 was confirmed as 3.5 µm.

Next, the molded body was produced by the same method as that in Comparative Example 2. The sintering process and the aging treatment were carried out to obtain the sintered body.

Then, Br and HcJ were calculated according to the measurement results obtained by the B—H tracer with the same method as that in Comparative Example 1. It was confirmed that the major formation phase in the obtained sintered body had the tetragonal structure of $R_2T_{14}B$. It was confirmed from the results of FE-SEM and EDS that the Ce-rich grain boundary phase was present besides the main phase, the concentration x of Ce in this grain boundary phase was calculated. After that, Fgb and Atre were calculated. The results were shown in Table 1.

Comparative Example 3

The alloy sheets were prepared and pulverized by the same method as that in Comparative Example 1 except that the composition of the grain boundary phase was Ce 61.6 at %-Fe 26.1 at %-Co 10.3 at %-Cu 1.0 at %-Al 1.0 at %. After the particle diameter of the obtained fine powder was measured by the particle size distribution meter, the vale of D50 was confirmed as 3.5 µm.

Next, the molded body was produced by the same method as that in Comparative Example 2. The sintering process and the aging treatment were carried out to obtain the sintered body.

Then, Br and HcJ were calculated according to the measurement results obtained by the B—H tracer with the same method as that in Comparative Example 1. It was confirmed that the major formation phase in the obtained sintered body had the tetragonal structure of $R_2T_{14}B$. It was confirmed from the results of FE-SEM and EDS that the Ce-rich grain boundary phase was present besides the main phase. And, the concentration x of Ce in this grain boundary phase was calculated. After that, Fgb and Atre were calculated. The results were shown in Table 1.

Comparative Example 4

The alloy sheets were prepared and pulverized by the same method as that in Comparative Example 1 except that the composition of the grain boundary phase was Ce 93.0 at %-Co 5.0 at %-Cu 1.0 at %-Al 1.0 at %. After the particle diameter of the obtained fine powder was measured by the particle size distribution meter, the vale of D50 was confirmed as 3.6 µm.

Next, the molded body was produced by the same method as that in Comparative Example 2. The sintering process and the aging treatment were carried out to obtain the sintered body.

Then, Br and HcJ were calculated according to the measurement results obtained by the B—H tracer with the same method as that in Comparative Example 1. It was confirmed that the major formation phase in the obtained sintered body had the tetragonal structure of $R_2T_{14}B$. It was confirmed from the results of FE-SEM and EDS that the Ce-rich grain boundary phase was present besides the main phase. And, the concentration x of Ce in this grain boundary phase was calculated. After that, Fgb and Atre were calculated. The results were shown in Table 1.

Comparative Example 5

The alloy sheets were prepared and pulverized by the same method as that in Comparative Example 1 except that the composition of the grain boundary phase was Ce 28.5 at %-Fe 59.2 at %-Co 10.3 at %-Cu 1.0 at %-Al 1.0 at %. After the particle diameter of the obtained fine powder was measured by the particle size distribution meter, the vale of D50 was confirmed as 3.6 μm.

Next, the molded body was produced by the same method as that in Comparative Example 2. The sintering process and the aging treatment were carried out to obtain the sintered body.

Then, Br and HcJ were calculated according to the measurement results obtained by the B—H tracer with the same method as that in Comparative Example 1. It was confirmed that the major formation phase in the obtained sintered body had the tetragonal structure of $R_2T_{14}B$. It was confirmed from the results of FE-SEM and EDS that the Ce-rich grain boundary phase was present besides the main phase. And, the concentration x of Ce in this grain boundary phase was calculated. After that, Fgb and Atre were calculated. The results were shown in Table 1.

Example 4

The alloy sheets were prepared and pulverized by the same method as that in Comparative Example 1 except that the composition of the grain boundary phase was Ce 31.1 at %-Fe 56.6 at %-Co 10.3 at %-Cu 1.0 at %-Al 1.0 at %. After the particle diameter of the obtained fine powder was measured by the particle size distribution meter, the vale of D50 was confirmed as 3.6 μm.

Next, the molded body was produced by the same method as that in Comparative Example 2. The sintering process and the aging treatment were carried out to obtain the sintered body.

Then, Br and HcJ were calculated according to the measurement results obtained by the B—H tracer with the same method as that in Comparative Example 1. It was confirmed that the major formation phase in the obtained sintered body had the tetragonal structure of $R_2T_{14}B$. It was confirmed from the results of FE-SEM and EDS that the Ce-rich grain boundary phase was present besides the main phase. And, the concentration x of Ce in this grain boundary phase was calculated. After that, Fgb and Atre were calculated. The results were shown in Table 1.

Comparative Example 6

The alloy sheets were prepared and pulverized by the same method as that in Comparative Example 1 except that the composition of the grain boundary phase was Ce 19.6 at %-Nd 37.3 at %-Fe 30.8 at %-Co 10.3 at %-Cu 1.0 at %-Al 1.0 at %. After the particle diameter of the obtained fine powder was measured by the particle size distribution meter, the vale of D50 was confirmed as 3.6 μm.

Next, the molded body was produced by the same method as that in Comparative Example 2. The sintering process and the aging treatment were carried out to obtain the sintered body.

Then, Br and HcJ were calculated according to the measurement results obtained by the B—H tracer with the same method as that in Comparative Example 1. It was confirmed that the major formation phase in the obtained sintered body had the tetragonal structure of $R_2T_{14}B$. It was confirmed from the results of FE-SEM and EDS that the Ce-rich grain boundary phase and the Nd-rich grain boundary phase were present besides the main phase. And, x, Fgb and Atre were calculated by the same method as that in Example 1. The results were shown in Table 1.

If Examples 1 to 3 and Comparative Examples 1 to 4 were compared, it could be seen that with the increase of the concentration x of Ce, HcJ increased. And in the case of 0.20≤x≤0.55, the magnet could be obtained with the residual magnetic flux density equal to that of conventional Nd—Fe—B magnet as well as the increased coercivity. It could be known from the results of Fgb that the dihedral angle of 90° or less at the triple junction of the main phase could enhance by increasing the concentration of Ce in the grain boundary phase. Thus, it was considered that compared to the grain boundary phase in the conventional Nd—Fe—B magnet, the grain boundary phase of the present invention had a improved compatibility with the main phase grains, and the percentage of coverage of the main phase grains by the boundary phase grains was enhanced. Also, the coercivity was improved with the development of the magnetic separation. Further, it was believed that as Atre was controlled at the proper range, the decrease of the volume of the main phase was little and the decrease of the residual magnetic flux density also became little.

In addition, if Examples 2, 4 and Comparative Examples 5, 6, in which Ce was contained with the same level of the concentration, were observed, even if Fgb was high enough and the compatibility of the grain boundary phase with the main phase was sufficient, the magnet with the residual magnetic flux density equal to that of the conventional Nd—Fe—B magnet as well as the improved coercivity could be obtained only in the case of 0.03<Atre<0.07. In the case of Atre being 0.03 or less, even though the compatibility of the grain boundary phase with the main phase was high and the grain boundary phase had a property of easily covering the main phase grains, the main phase could not be fully covered because the ratio of the grain boundary phase was small. Besides, in the case of Atre being 0.07 or more, since the ratio of the grain boundary phase became large and the volume of the main phase grains reduced, the residual magnetic flux density decreased even though the coercivity could be improved.

TABLE 1

| | Grain boundary phase | x | Atre | Fgb | HcJ (kOe) | Br (kG) |
|---|---|---|---|---|---|---|
| Comparative Example 1 | Nd64at%-Fe23.7at%-Co10.3at%-Cu1.0at%-Al1.0at% | 0 | 0.062 | 0.26 | 14.6 | 13.4 |
| Comparative Example 2 | Ce10.1at%-Nd71.1at%-Fe6.5at%-Co10.3at%-Cu1.0at%-Al1.0at% | 0.11 | 0.095 | 0.33 | 21.0 | 12.5 |
| Example 1 | Ce13.5at%-Nd25.5at%-Fe48.7at%-Co10.3at%-Cu1.0at%-Al1.0at% | 0.20 | 0.047 | 0.64 | 19.6 | 13.8 |
| Example 2 | Ce23.2at%-Nd27.7at%-Fe36.8at%-Co10.3at%-Cu1.0at%-Al1.0at% | 0.33 | 0.065 | 0.79 | 22.6 | 13.5 |
| Example 3 | Ce54.5at%-Fe33.2at%-Co10.3at%-Cu1.0at%-Al1.0at% | 0.55 | 0.069 | 0.92 | 26.3 | 13.4 |
| Comparative Example 3 | Ce61.6at%-Fe26.1at%-Co10.3at%-Cu1.0at%-Al1.0at% | 0.62 | 0.081 | 0.91 | 30.1 | 12.9 |
| Comparative Example 4 | Ce93.0at%-Co5.0at%-Cu1.0at%-Al1.0at% | 0.95 | 0.180 | 0.93 | 31.5 | 12.6 |
| Comparative Example 5 | Ce28.5at%-Fe59.2at%-Co10.3at%-Cu1.0at%-Al1.0at% | 0.33 | 0.030 | 0.22 | 12.7 | 14.0 |
| Example 4 | Ce31.1at%-Fe56.6at%-Co10.3at%-Cu1.0at%-Al1.0at% | 0.35 | 0.035 | 0.51 | 17.0 | 13.9 |
| Comparative Example 6 | Ce19.6at%-Nd37.3at%-Fe30.8at%-Co10.3at%-Cu1.0at%-Al1.0at% | 0.33 | 0.073 | 0.83 | 23.2 | 13.0 |

As described above, the permanent magnet according to the present invention has a high coercivity without using heavy rare earth elements that are short of resources and are unstable in the respects of price and supply. Thus, such a permanent magnet can be suitably used as a permanent magnet for a motor which can provide a high efficiency in the drive system of people's livelihood, industries and conveyer equipments.

DESCRIPTION OF REFERENCE NUMERALS

Figures 1, 2:
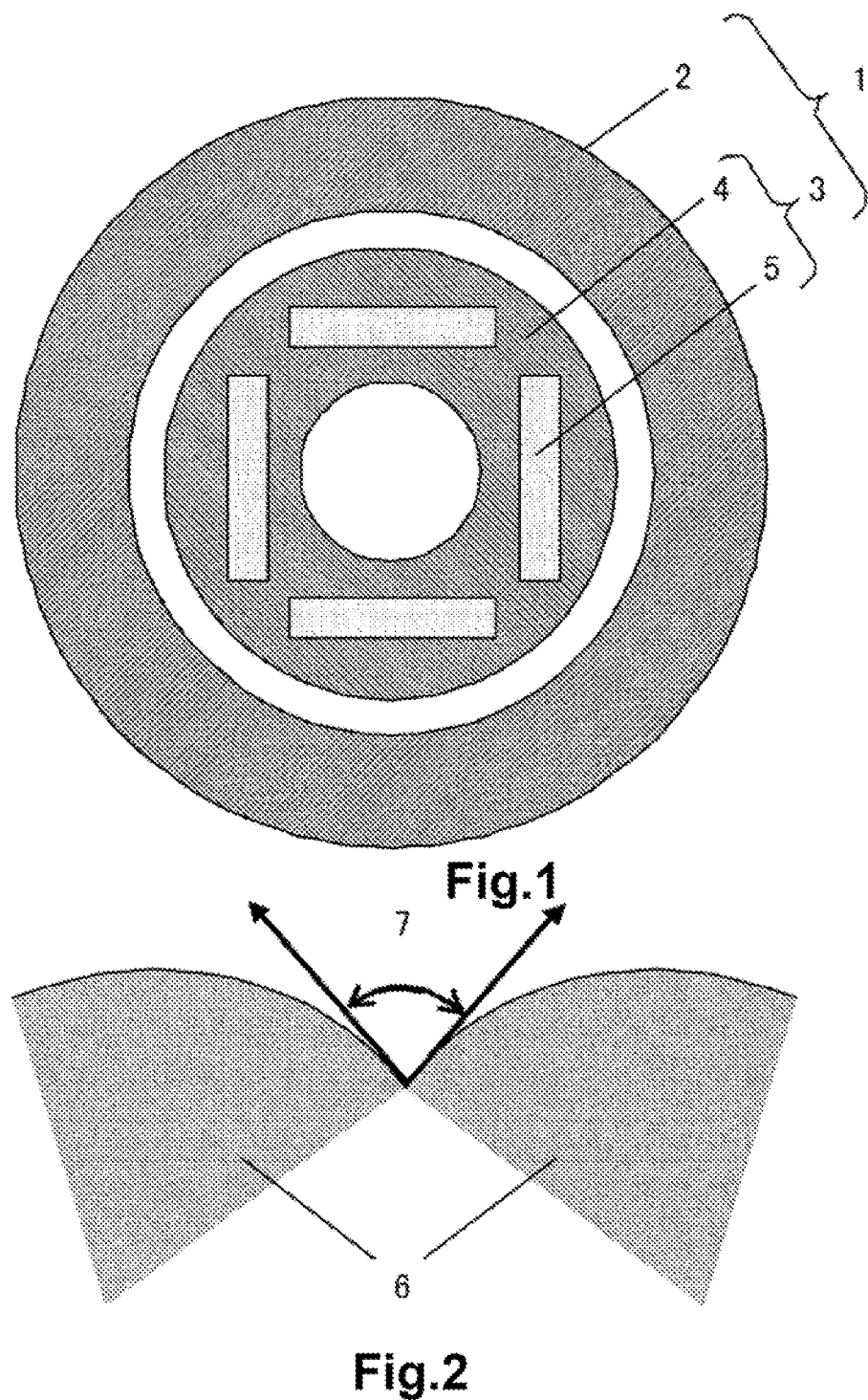
FIG. 1 is a cross-section view showing the embodiment of the motor according to the present invention.
FIG. 2 is a pattern view showing the dihedral angle formed by the main phase grains that constitutes the permanent magnet according to the present invention.

1 Permanent magnet embedded motor
2 Stator
3 Rotor
4 Iron core
5 Permanent magnet
6 Main phase grain
7 Dihedral angle

What is claimed is:

1. A permanent magnet, comprising:
   a main phase which is composed of the structure represented by $R_2T_{14}B$; and
   a grain boundary phase which is composed of $Ce_xM_{1-x}$, and the cross-sectional ratio Atre of the grain boundary phase to the whole magnet structure is within the range of $0.03 < Atre < 0.07$,
   wherein, R is at least one element selected from the group consisting of Y, La, Ce, Pr, Nd, Sm, Eu and Gd,
   T is one or more transition metal elements having Fe or a combination of Fe and Co,
   M is at least one element selected from the group consisting of Mg, Al, Si, Ti, Cr, Mn, Fe, Co, Ni, Cu, Zn, Ga, Y, Zr, Nb, Mo, Ag, In, Sn, La, Pr, Nd, Sm, Eu, Gd, Hf, Ta, W and Bi, and
   x is within the range of $0.20 \leq x \leq 0.55$.

2. The permanent magnet according to claim 1, wherein the frequency Fbg at the cross-section is within the range of $0.5 \leq Fgb$, where the dihedral angle formed by the main phase grains at the triple junction is 90° or less.

3. A motor using the permanent magnet according to claim 1.

4. A motor using the permanent magnet according to claim 2.

* * * * *